Aug. 8, 1961 J. T. BEARDWOOD III, ET AL 2,995,709
SINGLE-CYCLE-SINE-WAVE GENERATOR
Filed May 11, 1960
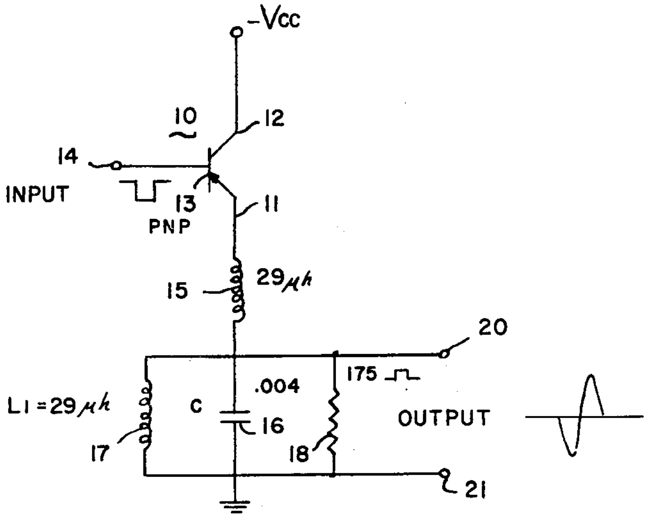
INVENTORS
JOSEPH T. BEARDWOOD III
ALFRED F. BURGER
BY Wade Koontz
ATTORNEY and
Richard J. Killoren
AGENT United States Patent Office 2,995,709
Patented Aug. 8, 1961

2,995,709
SINGLE-CYCLE-SINE-WAVE GENERATOR

Joseph T. Beardwood III and Alfred F. Burger, Philadelphia, Pa., assignors to the United States of America as represented by the Secretary of the Air Force Filed May 11, 1960, Ser. No. 28,504
2 Claims. (Cl. 328—27)

This invention relates to a circuit for producing a single cycle sine wave.

One object of the invention is to provide a transistor circuit which, when triggered by a rectangular input pulse, is capable of producing a single cycle sine wave having substantially equal amplitude positive and negative half-cycle peaks.

This and other objects will be more fully understood from the following detailed description taken with the drawing, wherein:

The single figure shows a single cycle sine wave generator according to this invention.

Previously, vacuum tube R-L-C peaker circuits with a narrow input pulse have been used to produce an approximate sine wave. These circuits, however, produce sine waves that have positive and negative half-cycle peaks of different amplitude. The circuit of this invention was found to produce equal amplitude positive and negative peaks.

Referring more particularly to the drawing, reference number 10 refers to a PNP transistor having an emitter 11 and a collector 12 connected to a negative collector supply-$V_{cc}$. A negative input pulse is applied to the base 13 at terminal 14.

A series oscillatory circuit made up of an inductor 15 and a capacitor 16 is connected in the emitter circuit 11 of transistor 10. An inductor 17 of the same value as inductor 15 is connected in parallel with capacitor 16 to form a parallel oscillatory circuit. Both circuits are critically damped by a resistance 18. The output is taken off of the circuit at terminals 20 and 21.

In the operation of the device, a negative pulse having a width of about 1 $\mu$Sec. is applied to the base 13 at terminal 14. This causes transistor 10 to suddenly change from the "Off" state to the "On" state. Capacitor 16 is charged by emitter current flowing through inductor 15 and transistor 10. The series oscillatory circuit made up of inductor 15 and capacitor 16 produces the negative half-cycle of the sine wave. The low output resistance 18 in the emitter follower circuit causes the oscillation during the conducting period of transistor 10 to die away rapidly. At the end of the input pulse, transistor 10 is turned off and the current in inductor 17 flows into capacitor 16 charging it in the other direction thus producing the positive half-cycle. Again, because of resistor 18, a critically damped situation exists and only a single positive peak is produced. Both the negative and positive peaks occur in time such that their combination appears as a sine wave.

The period of the one cycle sine wave can be changed to any desired value by the proper choice of circuit parameter and input pulse widths.

When a NPN transistor is used the input pulse would be positive.

There is thus provided a circuit for producing a single cycle sine wave having substantially equal amplitude positive and negative half-cycle peaks.

While one specific embodiment has been described in detail, it is obvious that numerous changes may be made without departing from the principles and scope of the invention.

We claim:

1. A single cycle sine wave generator comprising: a transistor, means for applying a pulse signal to the base of said transistor, a first series oscillatory circuit having a first inductance and a capacitance, connected in the emitter circuit of said transistor, a second oscillatory circuit connected in the emitter circuit of said transistor, said second oscillatory circuit including said capacitance and a second inductance at the same value as said first inductance connected in shunt with said capacitance, means connected in said emitter circuit for critically damping said first and said second oscillatory circuit and an output means connected across said capacitance.

2. A single cycle sine wave generator comprising: a PNP transistor, means for applying a negative pulse signal to the base of said transistor, a first series oscillatory circuit having a first inductance and a capacitance connected in the emitter circuit of said transistor, a second parallel oscillatory circuit connected in the emitter circuit of said transistor, said second oscillatory circuit including said capacitance and a second inductance of the same value as said first inductance and resistance means connected across said parallel oscillatory circuit for critically damping said first and said second oscillatory circuit and an output means connected across said capacitance.

References Cited in the file of this patent

UNITED STATES PATENTS 2,464,279 Zarem et al. ------------ Mar. 15, 1949

OTHER REFERENCES

Kuntzleman: IBM Technical Disclosure Bulletin, vol. 1, No. 4, December 1958, page 29.